United States Patent [19]

Myers et al.

[11] Patent Number: 5,013,386
[45] Date of Patent: May 7, 1991

[54] APPARATUS FOR APPLYING THIN ROLL MATERIAL TO A SURFACE

[76] Inventors: Virginia A. Myers, Tenacre - R.R. #1, Solon, Iowa 52333; Daniel L. Wenman, R.R. 2, Oxford, Iowa 52322; James R. Phillips, 22 S. Mt. Vernon Dr., Iowa City, Iowa 52240

[21] Appl. No.: 317,762

[22] Filed: Mar. 2, 1989

[51] Int. Cl.$^5$ .............................................. B32B 31/20
[52] U.S. Cl. .................................. 156/351; 156/359; 156/494; 156/574; 156/577; 156/579
[58] Field of Search ............... 156/523, 527, 574, 577, 156/579, 494, 351, 359, 522, 233, 241, 578, 583.1, DIG. 36, DIG. 51; 226/89, 90, 176, 189; 101/25, DIG. 31

[56] References Cited

U.S. PATENT DOCUMENTS

| | | | |
|---|---|---|---|
| 677,128 | 6/1901 | Glenzinger | 156/577 |
| 1,136,497 | 4/1915 | Swallow | 156/579 |
| 2,192,634 | 3/1940 | Blomguist | 156/494 |
| 3,575,972 | 4/1971 | Billings | 156/233 |
| 4,242,166 | 12/1980 | Izumihara | 156/351 |

Primary Examiner—Caleb Weston
Attorney, Agent, or Firm—James C. Nemmers

[57] ABSTRACT

A manually-operated device for applying a very thin material, such as roll leaf, from a roll onto a flat surface so as to imprint the material and produce an artistic result. The device has a dispenser for holding the roll of material, and the material is guided through a predetermined path under a heated stamping roller, the temperature of which is automatically controlled and maintained at a desired temperature. By using handles on the sides of the device, the user advances the roller over the material, which is dispensed smoothly, so as to apply the material to the selected surface. The device includes a manually-operated cutter to facilitate cutting of the material on a straight line when the desired amount has been applied.

6 Claims, 2 Drawing Sheets

APPARATUS FOR APPLYING THIN ROLL MATERIAL TO A SURFACE

BACKGROUND OF THE INVENTION

The invention relates generally to a device which will flat stamp roll leaf onto a variety of substrates for the purpose of creating original works of art. Roll leaf material is used in a variety of applications, primarily by commercial artists and printers to apply or imprint on a surface usually a metallic material such as gold or silver. This leaf material is supplied in rolls and consists of multiple layers of material that have an adhesive backing which when heated will be activated. The primary layer in this material is a polyester carrier which is then covered with a lacquer color coat and a metalized layer and topped with a heat and pressure sensitive adhesive layer. These layers are extremely thin as is the resulting material which makes it somewhat difficult to handle and properly apply to the desired substrate.

There are a number of devices commercially available for flat-stamping roll leaf onto a variety of substrates, but these devices have been designed primarily to reproduce work by commercial artists and for use in industrial environments. As a result, the prior art devices are relatively complex and expensive. In addition, there are available small and rather unsophisticated devices that are not precision instruments and produce a product of an inferior quality.

Typically, the large commercial devices for hot-stamping roll leaf are large presses that weigh several thousand pounds and require specially trained operators. Even the smaller devices are not portable and are designed to be set in place. Although the smaller devices are easier to use, they generally cannot be used for an article larger than 12 inches in either dimension and usually are much smaller. For individual contemporary artists, this is an unacceptable limitation.

Moreover, one version of the smaller devices requires it to be used with a copy machine using powdered toner, thus limiting its use to those who have such a copier. Also, this particular printer is not capable of stamping leaf on top of leaf. Thus, an imperfectly stamped image cannot be corrected, and if more than one color is to be used on the same image, the leaf must be first manually cut and placed over the desired area. Because the metalized leaf is extremely thin and subject to static electricity, manually cutting the leaf accurately is almost impossible.

The only available device for use by a contemporary artist or a student attempting to learn art is a small electric hand tool resembling an ordinary paint roller. This tool has an aluminum roller covered with silicone, and the roller is heated and rolled back and forth over the leaf, which must be dispensed by hand from the roll on which it is provided. The leaf must cut by hand, usually with scissors, placed on the substrate and then rolled back and forth with the heated silicone roller while bringing adequate pressure to bear on the leaf to cause it to adhere. The operation is not only clumsy, it is tiresome and inaccurate and does not produce a product of the highest quality unless the user is extremely skilled. The particular device of this type that is commercially available also has a number of other inconvenient aspects to it which make it both difficult and frustrating to use.

It is therefore evident that the known, prior art devices for flat-stamping of roll leaf are not suitable for use by artists and students. There is therefore a need for a flat-stamping device of modest size, weight and costs which will satisfy the needs of artists and students who wish to incorporate hot-stamped roll leaf into their original prints. There is a need for such a device which can produce prints of a size larger than a few square inches, and one which can be used with a minimum of instruction and training, even by a person not normally skilled in using machinery.

SUMMARY OF THE INVENTION

The device of the invention has a handle on each side of a housing which contains a dispenser for holding and dispensing the roll of leaf or foil, the free end of which is guided through a predetermined path by means of a series of rods, one of which floats to pull the leaf tight before it passe under the stamping roller. The stamping roller is a silicone-covered aluminum roller heated by means of a quartz halogen incandescent lamp fitted inside of the aluminum roller. Appropriate electronics, built into one of the handle blocks, exits through one handle via a length of electric cord terminating in a standard plug. The outside edges of the housing are formed to provide different resting and operating positions for the device without the need for a separate rack or carrier. The device is also preferably provided with a cutter mounted on the housing to permit the foil or leaf to be easily cut.

DESCRIPTION OF THE PREFERRED EMBODIMENT OF THE INVENTION

In order to properly hot-stamp foil or leaf on a substrate, it is necessary to apply the proper amount of heat with pressure for a sufficient time to cause the foil or leaf to adhere to the substrate. The large, expensive machines used in commercial situations to apply foil have the ability of applying very large amounts of pressure. However, by applying heat in the range of 200° to 250° F., an individual working alone can apply a sufficient amount of pressure over a relatively short period of time if a proper device were available. The invention relates to such a device that is a practical tool for artists and students to use in making editionable images of almost any dimension.

Figure 1:
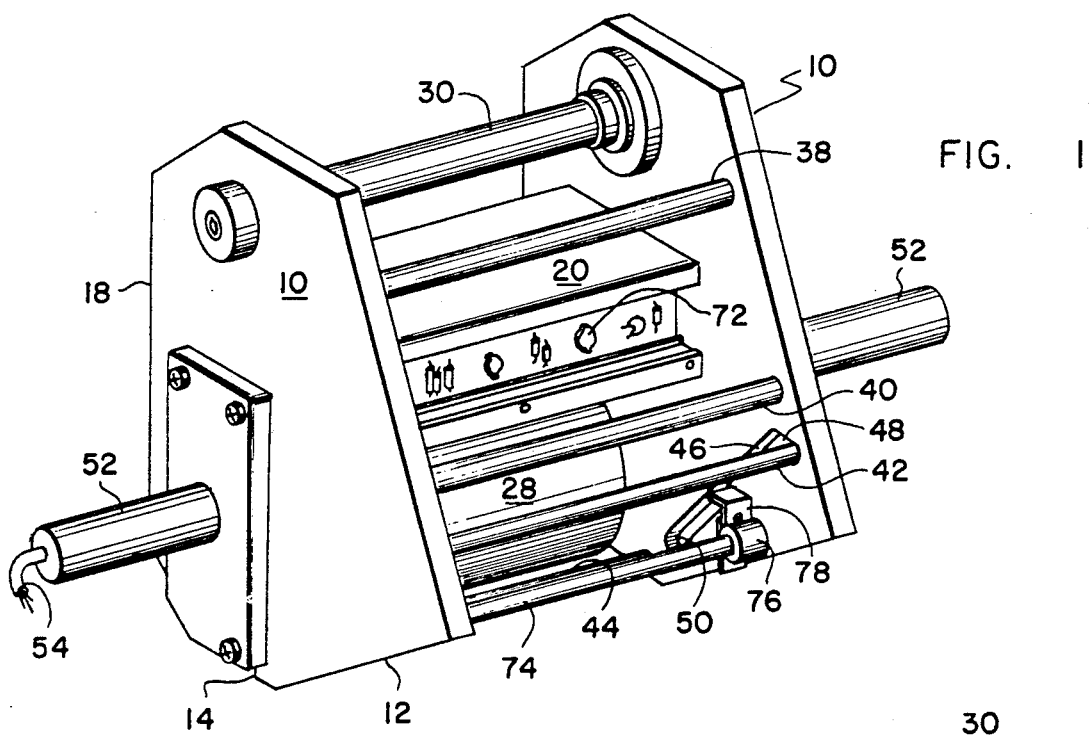
FIG. 1 is a perspective view of the device, viewing the device from the right front.
Figure 4:
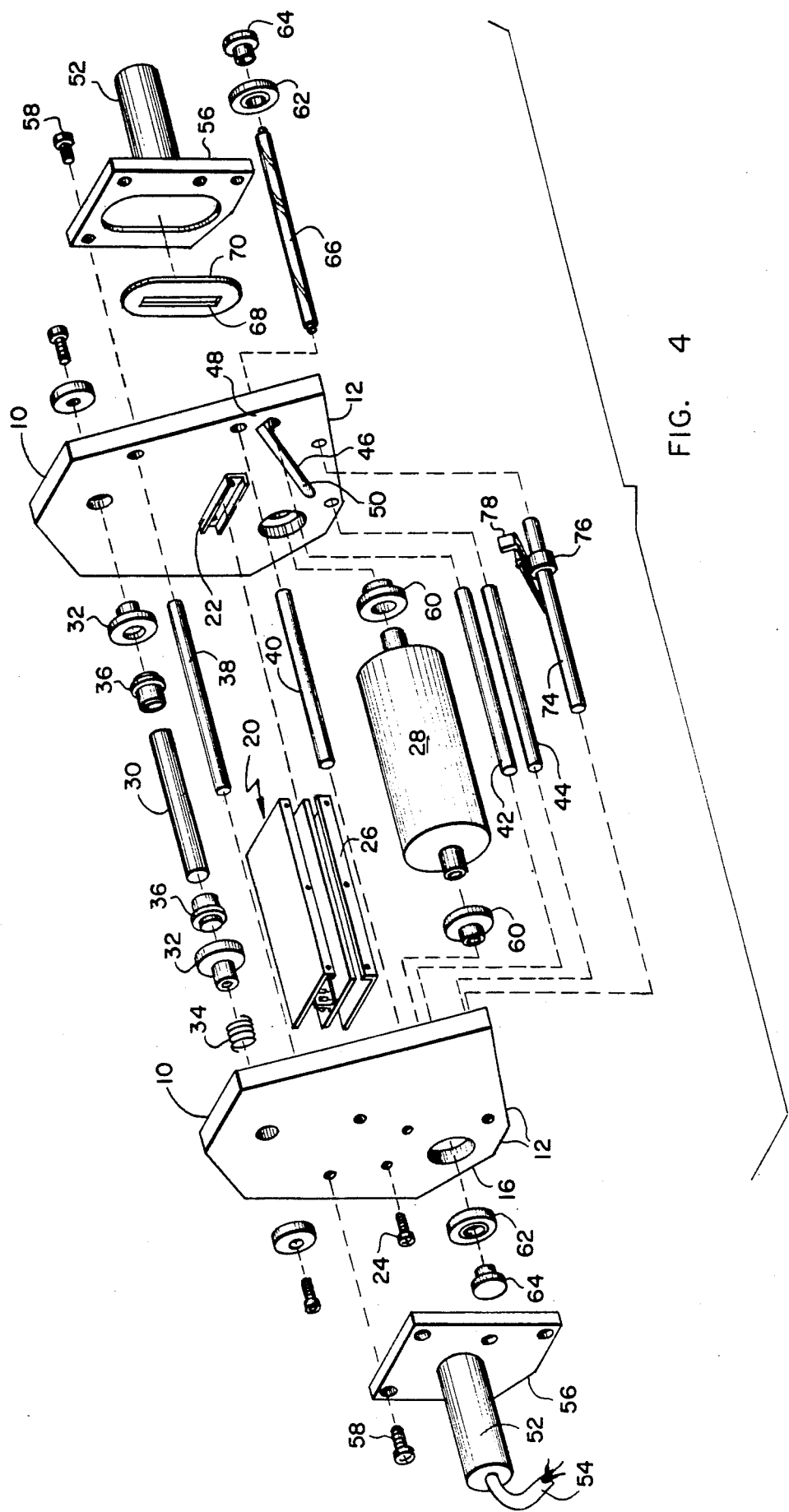
FIG. 4 is an exploded perspective view of the device of the invention.

Referring to the drawings, and particularly to FIG. 1 and FIG. 4, the device of the invention includes a housing, the principal components of which are two parallel spaced-apart side members 10. The perimeter or edge of each side member 10, has four distinct flat surfaces, each of which has a separate function. The surface 12 provides a resting or storage position for the device when it is not in use, and eliminates the necessity for a separate storage rack or carrier. Surface 14 is the surface used when the machine is in operation and the roller is applying the film to the substrate as will be described more fully herein after. Surface 16 is used to facilitate threading of the film through the predetermined path while surface 18 is used to make it more convenient to cut the foil and is also the preferred position for long-term storage or transportation of the device. The functions made more convenient by these positions will be described in detail hereinafter.

To maintain the side members 10 of the housing in their spaced-apart positions, there is provided an interior housing 20 that encloses the electronic package of the device. The housing 20 is held in place on the side members 10 by a suitable mounting member 22 fastened to each of the side members 10 by suitable fasteners 24. If desired, instead of mounting members 22, a suitable slot (not shown) may be formed in the inside surfaces of the side members 10 to provide support for the housing 20. Also, an insulating member 26 may be secured to the lower surface of housing 20 to shield the electronics contained in housing 20 from the heat radiating from the heated stamping roller 28.

The leaf or foil is commonly supplied on rolls in a variety of metalized and pigmented colors. A removable dispensing roller 30 is provided and is mounted on the side members 10 by means of suitable bearings 32. As best seen in FIG. 4, one of the bearings 32 has a resilient member, such as spring 34, positioned between the bearing 32 and the side member 10 to bias the bearing 32 inwardly. The dispensing roller 30 includes a removable end cap 36, and the ends of roller 30 are seated in the bearings 32. Thus, by pushing bearing 32 outwardly to compress spring 34, the dispensing roller 30 together with its end cap 36 can be easily removed. When removed, end cap 36 can be slid off the roller 30, a roll of foil mounted on the roller 30, the end cap 36 replaced and then the dispensing roller 30 inserted in the device between bearings 32 by compressing spring 34. The pressure of spring 34 will maintain the dispenser roller 30 in place during use.

Figure 2:
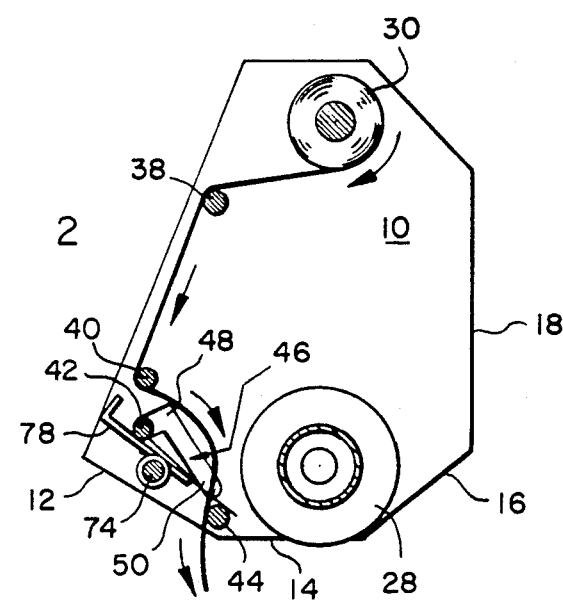
FIG. 2 is an end elevational view with a portion of the housing removed and other parts not shown in order to illustrate the path of the foil from the dispensing roll onto the surface to which it is to be applied.
Figure 3:
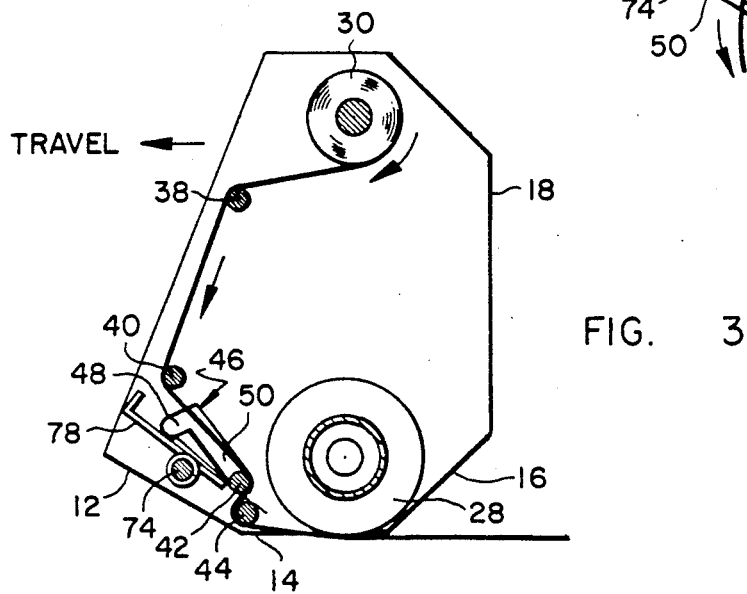
FIG. 3 is an end elevational view similar to FIG. 2 and showing the floating rod in its lower position to hold the foil.

Because the foil or leaf is extremely thin and subject to static electricity, it is necessary to provide guides and supports for the free-end of the foil as it is dispensed from the roller 30. There are four parallel strategically positioned rods that extend between the side members 10 parallel to the axis of the dispensing roller 30 and the stamping roller 28. Three of these rods are fixed, while one of them is a floating rod. The upper rod 38 is positioned just beneath the dispensing roller 30 and forwardly of it to receive the foil being unwound from the bottom of the roller 30. The second stationary lower rod 40 is positioned directly below and slightly forwardly of the upper rod 38. As best seen in FIGS. 2 and 3, the foil follows a path in front of the upper rod 38 and lower rod 40. The foil then passes behind floating rod 42 and in front of and beneath the third stationary bottom rod 44. All of the stationary rods, 38, 40 and 44 are held in position by inserting their ends in properly positioned openings in the inside surfaces of the side members 10, as best seen in FIG. 4. The floating rod 42 is moveable along a path that is defined by slots 46 formed in the inside surfaces of the side members 10. Each slot 46 has an upper short leg 48 that extends downwardly and forwardly and is connected to a longer lower leg 50 that extends downwardly and rearwardly. The floating rod 42 is free to move within the slot 46, and its position will depend upon the position of the device so that gravity will move the floating rod 42 either into the upper leg 48 or the lower leg 50. The purpose of the floating rod 42 is to allow the foil or leaf to be easily threaded along the path defined by the rods, but also rod 42 holds the leaf taut after the threading has been completed. As best seen in FIG. 2, the foil is threaded along a predetermined path with the floating rod 42 in its up position in the upper slot. The floating rod can easily be moved into this upper slot 48 by merely tipping the device forwardly. Using the handles 52 the device can be easily tipped forwardly so that it rests upon the surface 12, and in this position, the floating rod 44 will be maintained in the upper leg 48 of slot 46. Once the foil is threaded in front of the upper and lower rods 38 and 40 and behind the floating rod 42 and then in front of the bottom rod 44, the user can grasp the handles 52 and move it sharply rearwardly from the resting surface 12 toward the surface 16. This will cause the floating rod 42 to drop out of the upper leg 48 of slot 46 and down into the lower leg 50. As best seen in FIG. 3, in this position, the floating rod 42, in cooperation with the fixed bottom rod 44 will apply the proper tension to the foil during the stamping and cutting operations which are described hereinafter. As previously indicated, the floating rod 42 can be shifted between the upper leg 48 and the lower leg 50 of slot 46 by merely grasping the handles 52 and tilting the device forwardly or backwardly, as the case may be, thereby causing the floating rod 42 to shift in the slot 46.

The handles 52, of course, provide the means for the user to conveniently and easily hold and operate the device. One of the handles 52 also provides a convenient route for a power cord 54 which supplies the electrical power to the housing 20 containing the electronics that produces controlled heat to the stamping roller 28. Preferably, Phenolic tubing surrounds the exterior of each handle 52, which may be filled with a foam insulation. The handles 52 are secured to the side members 10 by means of mounting blocks 56 which are fastened to the side members 10 by suitable fasteners 58.

The stamping roller 28 is mounted at the bottom of the device between side members 10 using suitable bushings 60 that rotate in bearings 62 that are in turn mounted in the side members 10 and held in place by end caps 64 which are in turn secured by the mounting blocks 56. A tubular quartz halogen incandescent lamp 66 is positioned inside of the roller 28 as a heating element. The lamp 66 is easily replaced by removing the mounting block 56 on one side of the device, and removing the corresponding end cap 64 which will permit the lamp 66 to be easily removed and replaced. Electrical power is supplied to the lamp 66 through an electrical contact strip 68 imbedded in an insulated plate 70, the end of the lamp 66 being in contact with the strip 68 which in turn is connected in any suitable manner to the electronics in housing 20. A conductor 71 engages the surface of roller 28, and a thermistor (not shown) connected to the conductor 71 will sense the temperature of the roller 28. Suitable electronics in housing 20 controls the temperature of the heating lamp 66 to produce the desired temperature. If desired, the device of the invention can be provided with a visual readout of the temperature, which can be varied by a suitable control 72.

In order to facilitate cutting of the foil material, we prefer to provide near the front of the device just above the surface 12 a cutter which includes a rod 74 extending between the side members 10 and a slider ring 76 supported on the rod. Mounted on the slider ring is a cutter blade 78. When the foil is threaded between the various guide rods as previously described, the foil will be in a position where it can be cut by merely sliding the ring 76 from one side to the other producing a straight, clean cut of the foil while it is being held between the floating rod 42 and the bottom rod 44.

The operation in which foil or leaf is hot-stamped onto a substrate should be evident from the foregoing description. However, the operation is summarized as follows.

The device of the invention is operated much like a rolling pin in that the user grasps the handles 52 and pushes it forward away from the user's body or backwards according to the operation being performed. The foil or leaf is first threaded from the roll that is mounted on the dispensing roller 30 downwardly in front of the rods 38 and 40 and behind the floating road 42 and in front of and beneath the bottom rod 44. The foil roll should be placed on the dispensing roll 30 s that it will be fed from the bottom of the roll with the adhesive layer facing out or forwardly. As the foil follows the path defined by rods 38, 40, 42 and 44, the adhesive layer will face the substrate as it passes beneath stamping roller 28. When the foil is thus properly threaded, the user grasps the handles 52 and rotates the device backwards toward the user causing the floating rod 42 to dislodge itself from the upper leg 48 of slot 46 and drop downwardly to the bottom of the lower leg 50. In this position, the foil is held with the proper tension for the stamping operation. The user then places the device so that it rests on the heated roller 28, and with the device positioned over the substrate upon which the foil is to be applied, the user pushes the device slowly away from the user's body while bringing pressure on the stamping roller 28 by pushing downwardly on the handles 52. The foil or leaf will be smoothly dispensed and drawn over the guide rods, being held with the proper tension between the floating rod 42 and bottom rod 44. When the desired length of foil has been applied, the user can then reach to the front of the machine and move the slider ring 76 carrying the cutter blade 78 across the foil severing it. For long term rest or storage, the device can be tipped backwards until it rests on the surfaces 18 of side members 10. After the foil has been cut, the user can rotate the device until it rests on surfaces 12 or 16. If desired, the user can, after the foil has been cut, also pass the device back and forth over the stamped foil and use the stamping roller 28 to assure firm adhesion of the foil to the substrate.

Having thus described the invention in connection with the preferred embodiment of it, it will be evident to those skilled in the art that the device has numerous advantages over prior art ways of stamping foil. The device of the invention is of a size that can be easily hand operated and has many uses by the artist. Because it is portable, and also because it is self-contained and of modest size, it can be used to apply a large length of foil material. The width of the material to be applied is limited only by the availability of the material in different sized rolls and by the design width of the device itself. Since the foil or leaf is difficult to handle because it is extremely thin and has an affinity for static electricity, the device using a controlled guide path facilitates ease of application with a resulting finished product of the highest quality. The device has an easily replaceable heating element, and its entire design and construction is simple, rugged and relatively inexpensive. It is also safe and dependable for use by unskilled persons with a minimum of instruction. The application temperature can be varied and controlled to suit requirements of the material being applied.

It will be further evident to those skilled in the art that various revisions and modifications can be made to the preferred embodiment disclosed herein without departing from the spirit and scope of the invention. For example, if desired, a heat shield can be positioned so as to protect the electronics and to protect from inadvertent contact with the heated roller. It is our intention, however, that all such revisions and modifications that are obvious to those skilled in the art will be included within the scope of the following claims.

What is claimed is as follows:

1. An apparatus for applying thin roll material to a surface said apparatus comprising a housing having generally vertical spaced-apart side members dispensing means supported by said side members for removably retaining a roll of the material to be applied, a stamping roller supported by the side members so as to be engagable with the surface to which the material is to be applied, guide means between the dispensing means and the stamping roller to guide the material along a predetermined path from the dispensing means to the stamping roller, the guide means including a plurality of guide rods extending between the side members substantially parallel to the axis of the stamping roller, the guide rods being spaced-apart between the dispensing means and stamping roller to guide the material from the dispensing means beneath the stamping roller, all but one of the guide rods being fixed and the other one of the guide rods being moveable along a defined and limited path toward and away from the fixed guide rod closest to the stamping roller, the material passing between the moveable guide rod and the fixed guide rod closest to the stamping roller so that tension is applied to the material when the moveable guide rod moves toward the fixed guide rod closest to the stamping roller thereby clamping the material between them, means for controllably heating the surface of the stamping roller, and means connected to the housing to provide for manual operation of the apparatus by a user.

2. The apparatus of claim 1 in which the moveable guide rod is moveable in corresponding slots in the side members, each slot having a short leg connected to a long leg with the legs being oriented relative to the stamping roller so that the moveable rod moves from the short leg to the long leg as the apparatus is tilted by the user, the moveable rod being in the material clamping position when positioned in the long legs of the slots.

3. An apparatus for applying thin roll material to a surface, said apparatus comprising a housing having generally vertical spaced-apart side members, each side member having a plurality of flat, straight surfaces formed along its periphery, one such surface providing for a stable resting position for the apparatus during short periods of non-use, while another of such surfaces provides for storage during long period of non-use, and yet another of said surfaces provides for an operating surface, dispensing means supported by said side members for removably retaining a roll of the material to be applied, a stamping roller supported by the side members so as to be engagable with the surface to which the material is to be applied, the stamping roller extending slightly below the plane that extends across the last mentioned surfaces of the side members that provide an operating surface, guide means between the dispensing means and the stamping roller to guide the material along a predetermined path from the dispensing means to the stamping roller, means for controllably heating the surface of the stamping roller, and means connected to the housing to provide for manual operation of the apparatus by a user.

4. An apparatus for applying thin roll material having a heat sensitive backing to a surface, said apparatus comprising a housing having generally vertical spaced-apart side members, dispensing means supported by said side members for removably retaining a roll of the material to be applied, a stamping roller supported by the side members so as to be engagable with the surface to which the material is to be applied, guide means between the dispensing means an the stamping roller to guide the material along a predetermined path from the dispensing means to the stamping roller, the guide means including a plurality of guide rods extending between the side members substantially parallel to the axis of the stamping roller, the guide rods being spaced-apart between the dispensing means and stamping roller and all but one of the guide rods being fixed and the other one of the guide rods being moveable along a defined and limited path toward and away from the fixed guide rod closest to the stamping roller, the material passing between the moveable guide rod and the fixed guide rod closest to the stamping roller so that tension is applied to the material when the moveable guide rod moves toward the fixed guide rod closest to the stamping roller thereby clamping the material between them, means for controllably heating the surface of the stamping roller including sensing means combined with the stamping roller to measure and monitor the temperature of the roller, and means connected to the housing to provide for manual operation of the apparatus by a user.

5. The apparatus of claim 4 in which the moveable guide rod is moveable in corresponding slots in the side members, each slot having a short leg connected to a long leg with the legs being oriented relative to the stamping roller so that the moveable rod moves from the short leg to the long leg as the apparatus is tilted by the user, the moveable rod being in the material clamping position when positioned in the long legs of the slots.

6. An apparatus for applying thin roll material having a heat sensitive backing to a surface, said apparatus comprising a housing having generally vertical spaced-apart side members, each side member having a plurality of flat, straight surfaces formed along its periphery, one such surface providing for a stable resting position for the apparatus during short periods of non-use, while another of such surfaces providing for storage during long periods of non-use, and yet another of said surfaces providing for an operating surface, dispensing means supported by said side members for removably retaining a roll of the material to be applied, a stamping roller supported by the side members so as to be engagable with the surface to which the material is to be applied, the stamping roller extending slightly below the plane extending across the last mentioned of the surfaces of the side members that provide the operating surface, guide means between the dispensing means and the stamping roller to guide the material along a predetermined path from the dispensing means to the stamping roller, means for controllably heating the surface of the stamping roller including sensing means combined with the stamping roller to measure and monitor the temperature of the roller, and means connected to the housing to provide for manual operation of the apparatus by a user.

* * * * *